United States Patent
Pankaj et al.

(10) Patent No.: US 11,114,131 B2
(45) Date of Patent: *Sep. 7, 2021

(54) SYSTEM FOR CREATING AN INTERACTIVE VIDEO USING A MARKUP LANGUAGE

(71) Applicant: Bank of America Corporation, Charlotte, NC (US)

(72) Inventors: Chandan K. Pankaj, Robbinsville, NJ (US); Yuyin Ji, Plainsboro, NJ (US); Shankar Sangoli, Langhorne, PA (US); Ketul S. Vyas, Edison, NJ (US); Yacine Arbani, Doylestown, PA (US); William J. Cockayne, New Hope, PA (US)

(73) Assignee: Bank of America Corporation, Charlotte, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/996,033

(22) Filed: Aug. 18, 2020

(65) Prior Publication Data

US 2020/0381019 A1     Dec. 3, 2020

Related U.S. Application Data

(63) Continuation of application No. 15/979,692, filed on May 15, 2018, now Pat. No. 10,777,230.

(51) Int. Cl.
*G11B 27/036* (2006.01)
*G11B 27/34* (2006.01)

(52) U.S. Cl.
CPC ............ *G11B 27/036* (2013.01); *G11B 27/34* (2013.01)

(58) Field of Classification Search
CPC .............................. G11B 27/34; G11B 27/036
USPC ................. 386/240, 278, 280–282; 709/219; 715/234
See application file for complete search history.

(56) References Cited

U.S. PATENT DOCUMENTS

| | | | |
|---|---|---|---|
| 6,173,317 B1 | 1/2001 | Chaddha et al. | |
| 7,739,280 B2 | 6/2010 | Aravamudan et al. | |
| 9,081,580 B2* | 7/2015 | Gaffney | G06F 8/38 |
| 9,532,116 B2* | 12/2016 | Terpe | H04N 21/47217 |
| 9,583,140 B1* | 2/2017 | Rady | H04N 21/44016 |
| 10,223,458 B1* | 3/2019 | Decker | G06F 15/0291 |

(Continued)

OTHER PUBLICATIONS

Mary C. Long, "Interactive Video: The New Content Marketing Must-Have," http://www.adweek.com/digital/interactive-video/, 7 pages, Aug. 31, 2015.

*Primary Examiner* — Thai Q Tran
*Assistant Examiner* — Stephen R Smith
(74) *Attorney, Agent, or Firm* — Michael A. Springs (57) ABSTRACT

A system creating an interactive video using a markup language is disclosed. The disclosed system receives a video request including a set of source scene IDs arranged in a predetermined ordering. The system retrieves a set of source scenes associated with the set of source scene IDs and generates video scenes in the form of a Hypertext Markup Language (HTML) page for the set of source scenes. Each of the generated video scenes includes one or more interactive HTML elements and one or more animations. The system then generates a scene collection to include the video scenes arranged based on the predetermined ordering and renders the video scenes in the scene collection.

20 Claims, 4 Drawing Sheets

(56) References Cited

U.S. PATENT DOCUMENTS

| | | | |
|---|---|---|---|
| 10,531,165 B1* | 1/2020 | Evans | H04N 21/4781 |
| 10,547,895 B1* | 1/2020 | Morris | G06F 3/00 |
| 2004/0220926 A1 | 11/2004 | Lamkin et al. | |
| 2009/0138906 A1 | 5/2009 | Eide et al. | |
| 2010/0050083 A1* | 2/2010 | Axen | H04N 5/85 |
| | | | 715/726 |
| 2010/0058172 A1* | 3/2010 | Soldan | G06F 40/143 |
| | | | 715/235 |
| 2010/0305999 A1* | 12/2010 | Fujioka | G06Q 30/02 |
| | | | 705/14.45 |
| 2012/0084807 A1 | 4/2012 | Thompson et al. | |
| 2013/0132818 A1* | 5/2013 | Anders | G06T 13/00 |
| | | | 715/234 |
| 2014/0047413 A1* | 2/2014 | Sheive | G06F 8/30 |
| | | | 717/110 |
| 2014/0078397 A1* | 3/2014 | Bloch | H04N 21/8545 |
| | | | 348/512 |
| 2014/0359656 A1* | 12/2014 | Banica | H04N 21/234 |
| | | | 725/32 |
| 2015/0121193 A1* | 4/2015 | Beveridge | G06F 40/143 |
| | | | 715/234 |
| 2016/0026730 A1* | 1/2016 | Hasan | G06F 40/143 |
| | | | 715/234 |
| 2016/0234568 A1* | 8/2016 | Grusd | H04N 21/47815 |
| 2017/0060857 A1* | 3/2017 | Imbruce | H04L 67/02 |
| 2017/0062009 A1* | 3/2017 | Clifton | G06K 9/00765 |
| 2017/0185596 A1* | 6/2017 | Spirer | H04N 21/475 |
| 2018/0226101 A1* | 8/2018 | Taylor | G11B 27/02 |
| 2019/0035431 A1* | 1/2019 | Attorre | G10L 17/00 |
| 2019/0057722 A1* | 2/2019 | Key | G11B 27/036 |
| 2019/0058845 A1* | 2/2019 | Macdonald-King | H04N 21/8456 |
| 2019/0108292 A1* | 4/2019 | Bowen | G06F 3/0485 |
| 2019/0114679 A1* | 4/2019 | Gangloff | G06T 13/80 |
| 2019/0355393 A1 | 11/2019 | Pankaj et al. | |

* cited by examiner

SYSTEM FOR CREATING AN INTERACTIVE VIDEO USING A MARKUP LANGUAGE

CROSS-REFERENCE TO RELATED APPLICATIONS

This application is a continuation of U.S. patent application Ser. No. 15/979,692 filed May 15, 2018, by Chandan K. Pankaj et al., and entitled "SYSTEM FOR CREATING AN INTERACTIVE VIDEO USING A MARKUP LANGUAGE," which is incorporated herein by reference.

TECHNICAL FIELD

This disclosure relates generally to creating a video, and more particularly to a system for creating an interactive video using a markup language.

BACKGROUND

When viewing web content on a web platform, users usually do not have the freedom or capability to define their own personalized experience. One problem with this is that it ignores each individual user's own distinct taste and preference on the web content, and thereby tends to provide irrelevant content to the users. This significantly degrades users' experience with the web platform. Further, the web platform may need infrastructure (e.g., hardware, software, network services) that consumes large computing and network resources (e.g., memory, bandwidth) for displaying and/or streaming the web content. Therefore, it is desirable to find a system that efficiently provides relevant web content to the users.

SUMMARY

Web platforms are growing and adding new capabilities on an ongoing basis. Every user of the web platforms is unique when it comes to identifying and defining information that meets their interest. Users today have to visit multiple areas within the web platforms to gather what is meaningful to them. Usually, users do not have the capability to define their own personalized web content and play back the web content without bouncing around multiple areas within the web platform. For example, a user may want to trade (e.g., buy or sell) a particular stock on a web platform. The user may go to a first place of the web platform to view statistics such as past performance of the stock, go to a second place of the web platform to check whether the user has enough account balance to trade the stock, and then go to a third place of the web platform to watch a video on how to conduct a trade on the stock. This significantly increases the time for the user to get the meaningful information and degrade the user's satisfaction with the web platform. What is needed is a platform that displays and/or streams web content to individual users in an integrated or unified manner, while allowing the users to customize and interact with the web content they want to view based on their preference. However, conventional web platforms do not provide users the capability to customize and interact with the web content they want to view. Furthermore, conventional web platforms may need infrastructure (e.g., hardware, software, network services) that consumes large computing and network resources (e.g., memory, bandwidth) for displaying and/or streaming the web content. This may further create a bottleneck on the network.

The present disclosure presents a system that supports a unified and interactive experience for users. For example, when a user wants to view information about a particular stock, account balance, and/or instructions on how to conduct a trade, the disclosed system serve this information up to the user as a single interactive video that enables drill-down capabilities.

In some embodiments, the user sends a request to the disclosed system requesting some web content, such as the information about a particular stock, account balance, and/or instructions on how to conduct a trade. The request may include a set of identifiers associated with a set of source scenes including Hypertext Markup Language (HTML) instructions and animation instructions related to the web content. In some embodiments, the set of source scenes including the HTML instructions and the animation instructions are written in a format of JavaScript Object Notation (JSON). The set of identifiers in the request may be specified by the user and arranged in a predetermined order.

After receiving the request specifying the identifiers of the source scenes, the disclosed system retrieves the source scenes corresponding to the identifiers and generates a video scene for each of the retrieved source scenes. In some embodiments, the video scene is generated for a source scene in a form of a HTML page based on the HTML instructions and the animation instructions included in the source scene. In some embodiments, a video scene includes one or more interactive HTML elements and one or more animations associated with the one or more interactive HTML elements. Next, the system generates a scene collection to include the video scenes generated for the retrieved source scenes. The video scenes in the scene collection are arranged based on the predetermined ordering for the identifiers in the request. The system further processes the scene collection by mapping the video scenes in the scene collection to a timeline and renders the video scenes for displaying to the user.

The disclosed system provides a technical solution to addressing a technical problem of efficiently rendering and streaming web content to users. Specifically, the disclosed system creates a video including the scene collection in the form of a series of HTML pages. Note that creating a video in the form of HTML pages is an unconventional technique. Conventional systems and methods usually present a video in the format of MP4, MOV, AVI, among others. Rendering and streaming a video having a form of HTML pages requires less computing resources and network resources than rendering and streaming videos having other formats such as MP4, MOV, and AVI. This facilitates decreasing the loading and buffering time of the web content, reducing response time of the disclosed system, and conserving computing resources and network resources. This further helps remove the network bottleneck. Further, the video includes interactive HTML elements that allow users to interact with the video. Allowing users to interact with the video facilitates increasing the efficiency of the disclosed system because the users do not need to go to different places (e.g., web pages) and bounce around to find the information they want. Instead, users can stay on and interact with the video to find the information they want. By doing this, users can avoid bouncing around multiple places and the system can avoid reloading or rebuffering the same web pages or content. This conserves network and computing resources, such as memories and processing power. Conventional systems and methods do not provide such capabilities to users to interact with a video. This has proven to be inefficient and degrades user experience.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Figure 1:
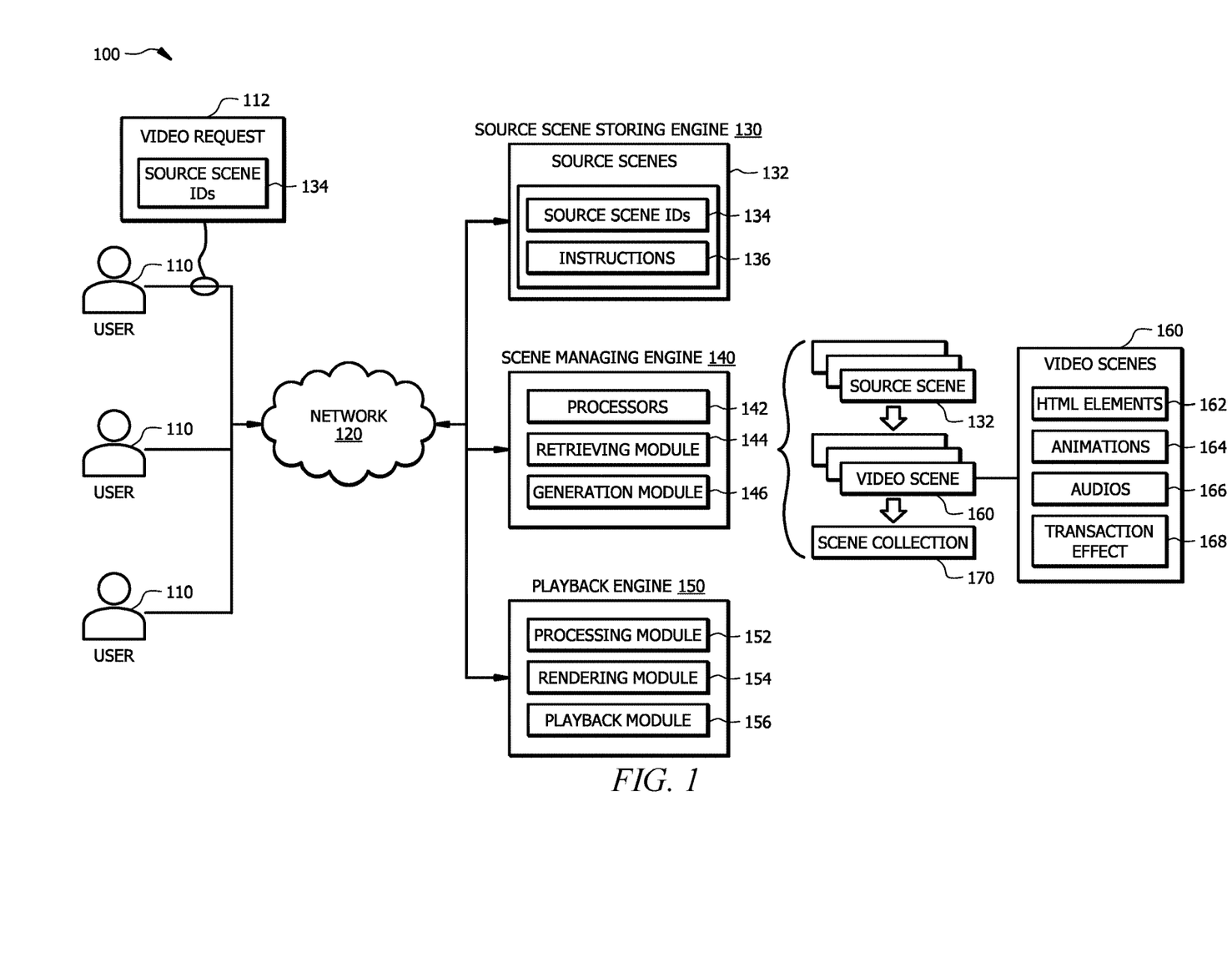
FIG. 1 illustrates an exemplary embodiment of a system for creating an interactive video using a markup language, according to the present disclosure.

FIG. 1 illustrates an exemplary embodiment of a system 100 for creating an interactive video using a markup language, according to certain embodiments of the present disclosure. System 100 includes one or more users 110, a network 120, a source scene storing engine 130, a scene managing engine 140, and a playback engine 150.

In general, system 100 receives a video request 112 from a user 110, retrieves a set of source scenes 132 from source scene storing engine 130, generates video scenes 160 in the form of HTML pages using scene managing engine 140, includes the video scenes 160 in a scene collection 170, and processes the scene collection 170 using playback engine 150.

Users 110 of system 100 comprise any suitable users including businesses or other commercial organizations, government agencies, and/or individuals. Users 110 may operate on one or more user devices to access system 100.

Network 120 includes any suitable networks operable to support communication between components of system 100. Network 120 may include any type of wired or wireless communication channel capable of coupling together computing nodes. Network 120 may include any interconnecting system capable of transmitting audio, video, electrical signals, optical signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 120 may be configured to support any communication protocols as would be appreciated by one of ordinary skill in the art upon viewing this disclosure.

Source scene storing engine 130 comprises any suitable server, processor, or computing element configured to store and maintain information. For example, source scene storing engine 130 may comprise any suitable storage scheme including any software, hardware, firmware, and/or combination thereof capable of storing information. Exemplary source scene storing engine 130 includes individual data storage devices (e.g., disks, solid-state drives), which may be part of individual storage engines and/or may be separate entities coupled to storage engines within. In some embodiments, source scene storing engine 130 stores third-party databases, database management systems, a file system, and/or other entities that include or that manage data repositories. Source scene storing engine 130 may be locally located or remotely located to other components of system 100. In some embodiments, source scene storing engine 130 is configured to store source scenes 132.

Source scenes 132 include source code for the web content requested by users 110. For example, source scenes 132 may include source code for generating relevant web content such as, for example, stock information, account balance information for users 110, and instructions on how to conduct a trade, among others. In some embodiments, each source scene 132 includes a source scene identifier (ID) 134 and a set of instructions 136 comprising HTML instructions and animation instructions related to the web content. For example, referring to FIG. 2, a source scene 132 includes source scene ID 134, HTML instructions 202, and animation instructions 204. In some embodiments, the instructions 136 in the source scenes 132 are written in a format of JavaScript Object Notation (JSON). In alternative embodiments, the instructions 136 in the source scenes 132 may be written in any other suitable format.

The HTML instructions 202 in the source scenes 132 are used to generate HTML code for the web content associated with the source scenes 132. For example, the HTML instructions may include instructions 136 on the number and/or types of HTML elements that will be included in the generated HTML code. Note that a HTML element may have a format of HTML string, a Document Object Model (DOM) element, or a jQuery object, among others. The animation instructions 204 in the source scenes 132 are used to generate animations for the web content associated with the source scenes 132. For example, the animation instructions 204 may include instructions 136 on the number and/or types of animations that will be generated. In some embodiments, a source scene 132 further includes other instructions. For example, referring to FIG. 2, source scene 132 further includes audio instructions 206 and transition effect instructions 208.

Scene managing engine 140 comprises any suitable server, processor, or computing element configured to manage the source scenes 132. Scene managing engine 140 may include tools and libraries to support processing the source scenes 132. For example, scene managing engine 140 may be configured to retrieve source scenes 132 from source scene storing engine 130 and generate a video scene 160 for each of the retrieved source scenes 132 as described in greater detail below. In some embodiments, scene managing engine 140 includes one or more processors 142, a retrieving module 144, and a generation module 146.

Processors 142 comprise one or more processors configured to perform various processing functions for scene managing engine 140 and system 100. In certain embodiments, processors 142 communicatively couple to other components of scene managing engine 140, such as retrieving module 144 and generation module 146. In some embodiments, processors 142 communicatively couple to other components of system 100, such as source scene storing engine 130 and playback engine 150.

Retrieving module 144 comprises any suitable processing module configured to retrieve source scenes 132 from source scene storing engine 130. In some embodiments, retrieving module 144 receives a video request 112 from a user 110. The video request 112 may include a set of source scene IDs 134 arranged in a pre-determined ordering specified by the user 110. For example, a user 110 may want to trade (e.g., sell or buy) a particular stock using the disclosed system 100. The user 110 may want to view past performance of the stock, check whether the user 110 has enough account balance to trade the stock, and watch a video on how to conduct a trade on the stock. The disclosed system 100 may provide user 110 the capabilities to select sources scenes 132 related to such information. For example, the user 110 may specify, in the video request 112, a first source scene ID 134 associated with a first source scene 132 about statistics of stocks, a second source scene ID 134 associated with a second source scene 132 about account balances of the user 110, and a third source scene ID 134 associated with a third source scene 132 about instructions on conducting a trade. Note that the three source scene IDs 134 in the video request 112 are arranged in a pre-determined ordering, such as in the order of the first source scene ID 134, the second source scene ID 134, and the third source scene ID 134.

Retrieving module 144 may then read the source scene IDs 134 in the video request 112 and instruct the processors 142 to retrieve source scenes 132 associated with the source scene IDs 134 from the source scene storing engine 130. The retrieving module 144 identifies the source scenes 132 based on the source scene IDs 134 and retrieves the identified source scenes 132. The retrieving module 144 forwards the retrieved source scenes 132 to the generation module 146 for subsequent processing.

Figure 2:
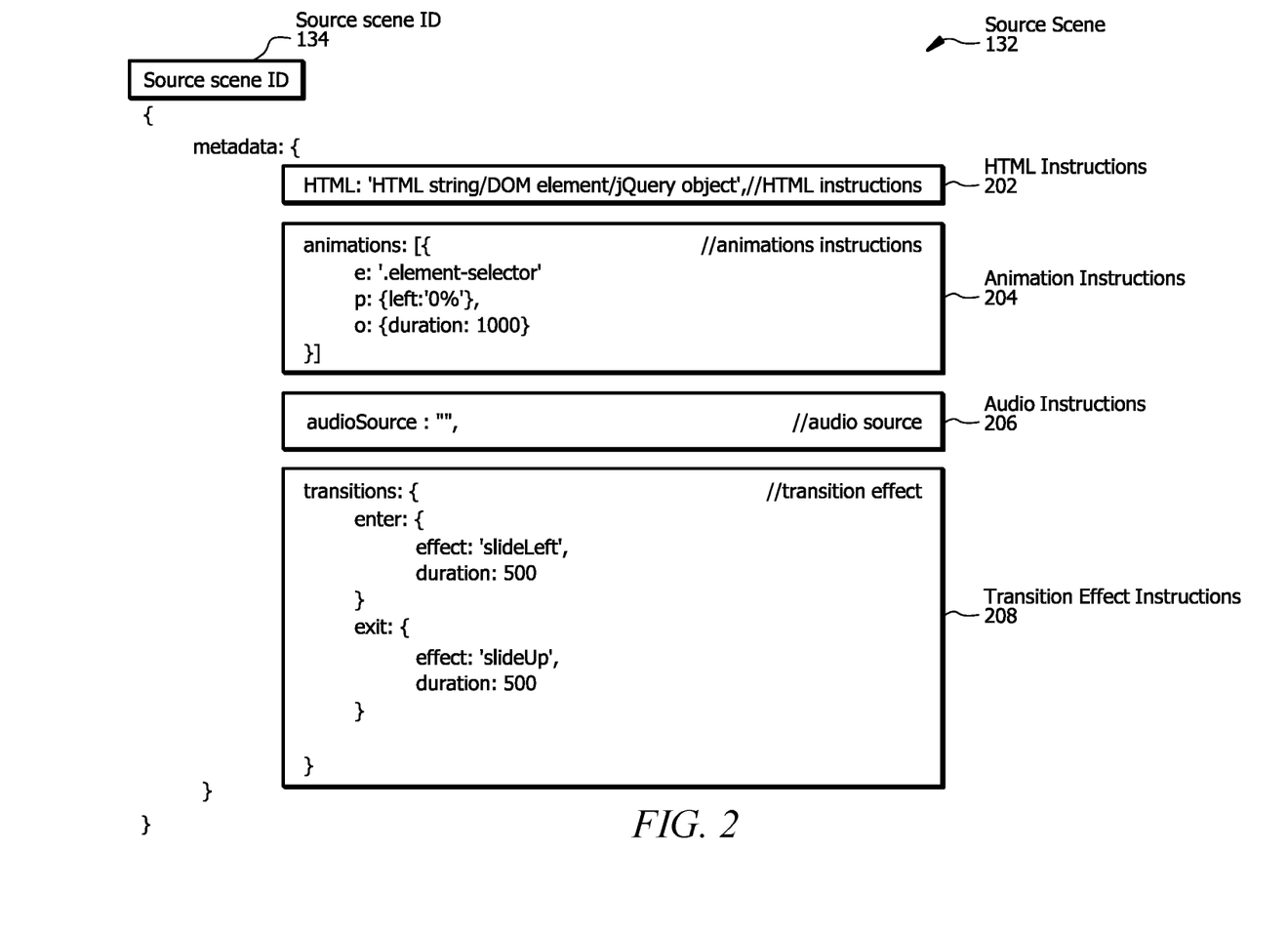
FIG. 2 illustrates an exemplary embodiment of a source scene, according to the present disclosure.

Generation module 146 comprises any suitable processing module configured to generate video scenes 160 from the source scenes 132 received from the retrieving module 144. In some embodiments, generation module 146 generates a video scene 160 in the form of a web page written in a markup language. For example, generation module 146 may generate a video scene 160 in the form of an HTML page. In some embodiments, video scene 160 includes one or more interactive HTML elements 162, one or more animations 164, one or more audios 166, and one or more transition effects 168. The one or more interactive HTML elements 162 may have a format of a HTML string, a DOM element, or a jQuery object. The animations 164 may have a format of JavaScript. In some embodiments, generation module 146 generates the video scenes 160 from the source scenes 132 based on the instructions 136 in the sources scenes 132. For example, generation module 146 may use the HTML instructions 202 in the source scenes 136 to generate HTML code including the interactive HTML elements 162 and use the animation instructions 204 in the source scenes 136 to generate one or more animations 164 associated with the HTML code. In some embodiments, the animations 164 written in JavaScript are embedded in the HTML code generated from the HTML instructions 202. Generation module 146 may further use the audio instructions 206 and transition effect instructions to generate audios 166 and transition effect 168 and insert them in the HTML code.

In some embodiments, the one or more interactive HTML elements 162 are implemented as one or more widgets that allow users 110 to interactively view information in the video scenes 160. For example, a first video scene 160 may include a first HTML element 162 implemented as a first widget, which provides a drill-down capability such as a dropdown menu showing a list of stocks. Each stock in the dropdown menu, when clicked by the user 110, may show statistics such as historical performance of the stock. As another example, a second video scene 160 may include a second HTML element 162 implemented as a second widget, which provides a drilldown capability such as a dropdown menu showing a list of accounts owned by the user 110, such as a retirement account, a checking account, and an investment account, among others. Each account in the dropdown menu, when clicked by the user 110, may show account balance of the account. As another example, a third video scene 160 may include a third HTML element 162 implemented as a third widget, which provides a drilldown capability such as a dropdown menu showing a list of videos on instructions on conducting a trade on, stocks, equities, bonds, and mutual funds, among others. In this example, each video in the dropdown menu, when clicked by the user 110, may play a video on instructions on conducting a particular trade.

The video scenes 160 include interactive HTML elements 162 that allow users to interact with the video scenes 160. Allowing users 110 to interact with the video scenes 160 facilitates increasing the efficiency of the disclosed system 100 because the users 110 do not need to go to different places (e.g., web pages) and bounce around to find and use the information they want. Instead, users 110 can stay on and interact with the video scenes 160 to find the information they want. By doing this, users 110 can avoid bouncing around multiple places and the system 100 can avoid reloading or rebuffering the same web pages or content. This facilitates reducing response time of the disclosed system 100, and conserving computing resources, memories and other network resources. This further helps remove the network bottleneck.

After generating video scenes 160 for all the source scenes received from the retrieving module 144, generation module 146 includes the video scenes 160 in a scene collection 170. The video scenes 160 in the scene collection 170 are arranged in an ordering corresponding to the pre-determined ordering of the source scene IDs 134 specified in the video request 112. The generation module 146 may further forward the generated scene collection 170 to playback engine 150 for subsequent processing.

Playback engine 150 comprises any suitable processing engine configured to process the video scenes 160 in the scene collection 170. Playback engine 150 may include tools and libraries to support creating a video based on the scene collection 170. For example, the playback engine 150 may be configured to receive scene collection 170 from the scene managing engine 140, process the video scenes 160 in the scene collection 170, and create a video based on the video scenes 160. In some embodiments, playback engine 150 includes a processing module 152, a rendering module, and a playback module 156.

Processing module 152 comprises any suitable processing module configured to process the scene collection 170. In some embodiments, processing module 152 receives the scene collection 170 from the scene managing engine 140 and processes the video scenes 160 in the scene collection 170. For example, processing module 152 may map the video scenes 160 to a timeline. Specifically, processing module 152 may assign an animation ID to each of the animations 164 associated with each of the video scenes 160. In some embodiments, each animation 164 may include one or more frames. Processing module 152 may further assign a frame ID to each of the frames in each of the animations 164. Then, the processing module 152 maps the frame IDs to a pre-determined timeline. For example, the processing module 152 may associate each frame ID with a time stamp in the pre-determined timeline. In some embodiments, the pre-determined timeline is determined based on the pre-determined ordering of source scene IDs in the video request 112. Processing module 152 may then send the processed scene collection 170 to the rendering module 154.

Rendering module 152 comprises any suitable rendering module configured to render the video scenes 160 in the received scene collection 170. Rendering module 152 may include tools and libraries to support parsing a markup language (e.g., HTML), analyzing elements in the markup language, and creating a formalized layout of the elements. For example, rendering module 152 may parse the video scenes 160 in the form of an HTML page, analyzing the interactive HTML elements 162 in the HTML page, and create a layout of the HTML page including some widgets implemented by the interactive HTML elements 162. For example, referring to FIG. 3, a first video scene 160 is rendered as a first rendered video scene 302-1 configured with two widgets 304, namely a first widget 304-1 and a second widget 304-2. The first widget 304-1 may be implementing a first interactive HTML element 162 of the first video scene 160, and the second widget 304-2 may be implementing a second interactive HTML element 162 of the video scene 160. As illustrated, the first widget 304-1 is configured to show assets of user 110 and the second widget 304-2 is configured to show liabilities of the user 110. When viewing a video including the rendered video scene 302-1, user 110 can pause the video at the video scene 302-1 and interact with any one of the two widgets 304. For example, user 110 may click on an HTML link or an interactive HTML element in the widgets 304. The HTML link or the interactive HTML element in the widgets 304, when clicked or pressed, may present one or more web content items or performs one or more predetermined drill-down tasks. The two widgets 304 of rendered video scene 302-1 provide users 110 with drill-down capabilities to view additional information. For example, when user 110 clicks on the first widget 304-1 showing assets of user 110, system 100 may display another rendered video scene 302-2 including another two widgets 304-3 and 304-4 that shows "important goal" and "essential goal" for user 110 respectively. The two widgets 304-3 and 304-4 may further have drill-down capabilities that allow user 110 to click on the widgets 304 and explore additional information.

Figure 3:
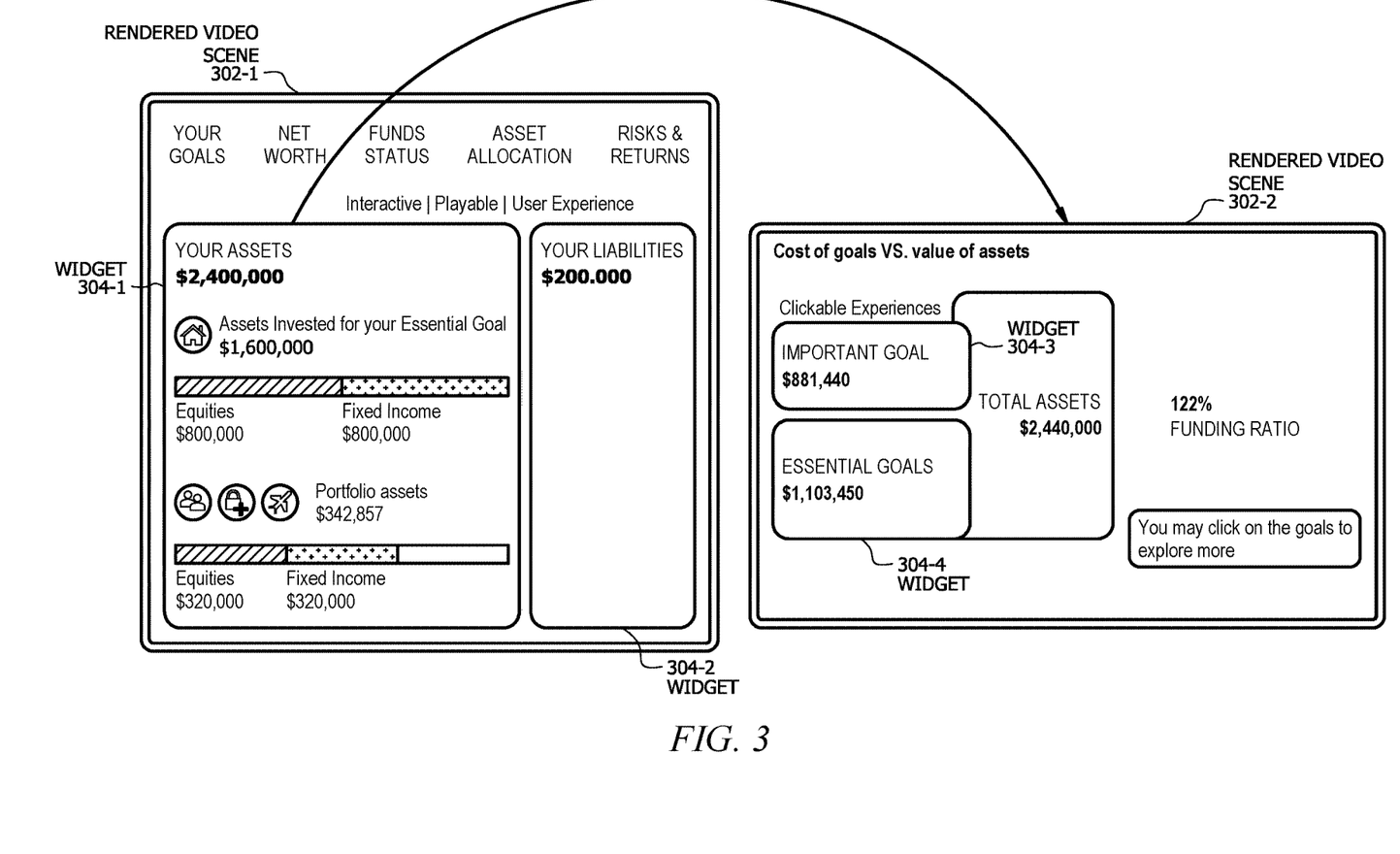
FIG. 3 illustrates an exemplary embodiment of a rendered video scene, according to the present disclosure.

Rendering module 152 may further render the animations 164 associated with a video scene 160. In some embodiments, rendering engine 152 creates a video by including the animations 164 in the rendered video scenes 160. Rendering engine 152 may then send the video to playback engine 156.

The disclosed system 100 therefore creates a video in the form of HTML pages. Note that creating a video in the form of a series of HTML pages is an unconventional technique which facilitates clicking on the HTML links and/or interactive HTML elements in the HTML pages of the video. Conventional systems and methods usually present a video in the format of MP4, MOV, AVI, among others. Rendering and streaming a video having a form of a series of HTML pages requires less computing resources and network resources than rendering and streaming videos having other formats such as MP4, MOV, and AVI. This facilitates decreasing the loading and buffering time of the web content, reducing response time of the disclosed system 100, and conserving computing resources and network resources.

Playback module 156 comprises any suitable playback module configured to play back the video generated based on the rendered scene collection 170. Playback module 156 may be configured to receive the video from the rendering module 154, map the timeline of the frames and/or the animations 164 to a play bar of the playback module 156, and play back the video for the user 110. The playback module 156 may play the video in the form of a series of HTML pages while allowing users 110 to pause and interact with the interactive HTML elements 162 implemented as widgets 304 in the video. In this way, the disclosed system 100 provide users 110 with an interactive video experience with drilldown capabilities, which supports customization and personalization for individual users 100.

An engine described in the present disclosure, such as source scene storing engine 130, scene managing engine 140, and playback engine 150, may include hardware, software, or other engine(s). An engine may execute any suitable operating system such as, for example, IBM's zSeries/Operating System (z/OS), MS-DOS, PC-DOS, MAC-OS, WINDOWS, a .NET environment, UNIX, OpenVMS, or any other appropriate operating system, including future operating systems. The functions of an engine may be performed by any suitable combination of one or more engines or other elements at one or more locations.

A module described in the present disclosure, such as retrieving module 144, generating module 146, processing module 152, rendering module 154, and playback module 156, may include hardware, software, or other module(s). A module may be a processor executing a special-purpose program, or may include programs executed by one or more processors. The functions of a module may be performed by any suitable combination of one or more modules or other elements at one or more locations.

A processor described in the present disclosure, such as processors 142, may comprise any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor may be a programmable logic device, a microcontroller, a microprocessor, or any suitable combination of the preceding. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

In some embodiments, the disclosed system 100 include one or more memories. For example, scene managing engine 140 may include a memory configured to store the source scenes 132 received form the source scene storing engine 130. As another example, playback engine 150 may include a memory configured to store the scene collection 170 received from the scene managing engine 140. The memories described in the present disclosure, may comprise any device operable to store, either permanently or temporarily, data, operational software, or other information for a processor. In some embodiments, the memory comprises one or more disks, tape drives, or solid-state drives, and may be used as an over-flow data storage device, to store programs when such programs are selected for execution, and to store instructions and data that are read during program execution. The memory may comprise any one or a combination of volatile or non-volatile local or remote devices suitable for storing information. For example, the memory may comprise random access memory (RAM), read only memory (ROM), magnetic storage devices, optical storage devices, semiconductor storage devices, or any other suitable information storage device or a combination of these devices.

In operation, the disclosed system 100 receives a video request 112 from a user 110. Specifically, the scene managing engine 140 receives the video request 112 that includes a set of source scene IDs 134. The source scene IDs 134 in the video request 112 are arranged in a pre-determined order specified by the user 110. Then, the retrieving module 144 of the scene managing engine 140 uses the source scene IDs 134 to retrieve the source scenes 132 corresponding to the source scene IDs 134 from the source scene storing engine 130. The retrieving module 144 sends the source scene 132 to generation module 146. Next, the generation module 146 receives the source scenes 132 and generates a video scene 160 for each of the received source scenes 132. For example, generation module 146 may generate a video scene 160 in the form of an HTML page for each source scene 132. In some embodiments, generation module 146 generates the video scenes 160 from the source scenes 132 based on the instructions 136 in the sources scenes 132. For example, generation module 146 may use the HTML instructions 202 in the source scenes 136 to generate HTML code including one or more interactive HTML elements 162 and use the animation instructions 204 in the source scenes 136 to generate one or more animations 164 associated with the HTML code.

After generating video scenes 160 for each of the source scenes 132 received from the retrieving module 144, generation module 146 includes the video scenes 160 in a scene collection 170. The video scenes 160 in the scene collection 170 are arranged in an ordering corresponding to the pre-determined ordering of the source scene IDs 134 specified in the video request 112. The generation module 146 may further forward the generated scene collection 170 to playback engine 150 for subsequent processing.

At the playback engine 150, the processing module 152 receives the scene collection 170 from the scene managing engine 140 and processes the video scenes 160 in the scene collection 170. For example, processing module 152 may map the video scenes 160 to a timeline. Specifically, processing module 152 may assign an animation ID to each of the animations 164 associated with each of the video scenes 160. In some embodiments, each animation 164 may include one or more frames. Processing module 152 may further assign a frame ID to each of the frames in each of the animations 164. Then, the processing module 152 maps the frame IDs to a pre-determined timeline. For example, the processing module 152 may associated each frame ID with a time stamp in the pre-determined timeline. In some embodiments, the pre-determined timeline is determined based on the pre-determined ordering of source scene IDs in the video request 112. Processing module 152 may then send the processed scene collection 170 to the rendering module 154.

Next, rendering module 152 parses the video scenes 160 in the form of an HTML page, analyzes the interactive HTML elements 302 in the HTML page, and creates a layout of the HTML page including some widgets implemented by the interactive HTML elements 302. Rendering module 152 may further render the animations 164 associated with the video scenes 160. In some embodiments, rendering engine 152 creates a video by including the animations 164 in the rendered video scenes 302. Rendering engine 152 then sends the video to playback engine 156.

Playback engine 156 receives the video from the rendering engine 156, maps the timeline of the frames and/or the animations 164 of the rendered videos scenes 302 to a play bar of the playback engine 156, and plays back the video for the user 110. The playback engine 150 may play the video while allowing users 110 to pause and interact with the interactive HTML elements 302 in each video scene 160 in the video. In some embodiments, the interactive HTML elements 302 are implemented as widgets 304 that allow users 110 to interactively view information in the video scenes 160.

The disclosed system 100 facilitates creating a video in the form of HTML pages while allowing users 110 to pause and interact with the interactive HTML elements 302 in each video scene 160 in the video. In this way, the disclosed system 100 provide users 110 with an interactive video experience with drill-down capabilities, which supports customization and personalization for individual users 110. Creating a video in the form of HTML pages provides many advantages over conventional techniques. Conventional systems and methods usually present a video in the format of MP4, MOV, AVI, among others. Such video formats presented by conventional systems and methods do not have drill-down capabilities or allow users 110 to interact with the video. Rendering and streaming a video having a form of HTML pages requires less computing resources and network resources than rendering and streaming videos having other formats such as MP4, MOV, and AVI. This facilitates decreasing the loading and buffering time of the web content, reducing response time of the disclosed system 100, and conserving computing resources and network resources. This further helps remove the network bottleneck. Further, the video includes interactive HTML elements 302 that allows users to interact with the video. Allowing users 110 to interact with the video facilitates increasing the efficiency of the disclosed system because the users 110 do not need to go to different places (e.g., web pages) and bounce around to find the information they want. Instead, users 110 can stay on and interact with the video to find the information they want. By doing this, users 110 can avoid bouncing around multiple places and the system 100 can avoid reloading or rebuffering the same web pages or content. This significantly increase the efficiency of the disclosed system 100.

Figure 4:
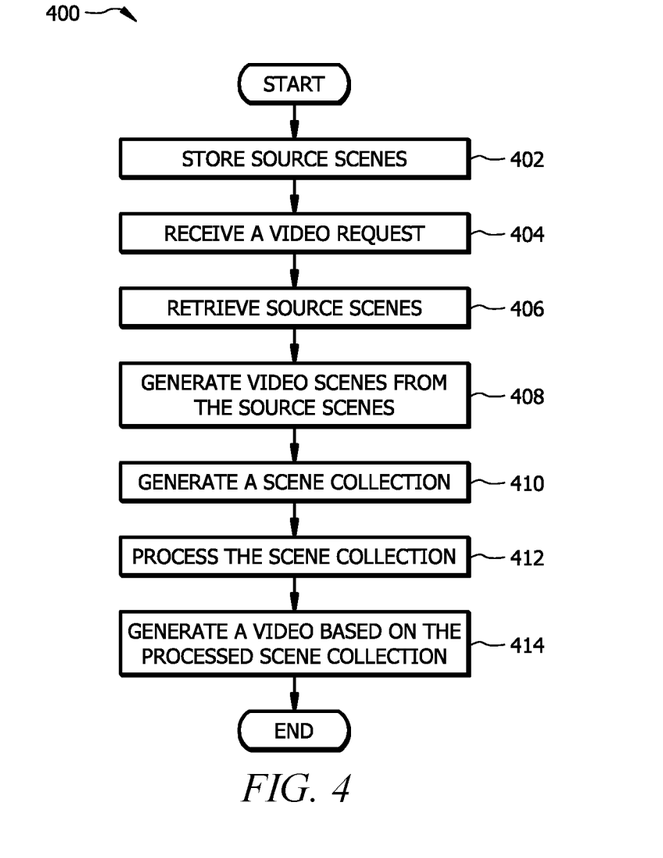
FIG. 4 presents a flow chart illustrating an exemplary embodiment of a method of creating an interactive video using a markup language, according to the present disclosure.

FIG. 4 presents a flow chart illustrating an exemplary embodiment of a method 400 of creating an interactive video using a markup language. The following is a non-limiting example that illustrates how system 100 implements method 400.

Upon starting the process, the disclosed system 100 stores the source scenes 132 in the source scene storing engine 130 (step 402). Each source scene 132 includes a source scene identifier (ID) 134 and a set of instructions 136 comprising HTML instructions 202 and animation instructions 204. At step 404, the system 100 receives a video request 112 from a user 110. The video request 112 includes a set of source scene IDs 134 that are arranged in a pre-determined order specified by the user 110. Then, the system 100 retrieves the source scenes 132 corresponding to the source scene IDs 134 (step 406). Next, the system 100 generates a video scene 160 for each of the retrieved source scene 132 (step 408). For example, system 100 may generate a video scene 160 in the form of a HTML page. In some embodiments, generation module 146 generates the video scenes 160 from the source scenes 132 based on the instructions 136 in the sources scenes 132. For example, generation module 146 may use the HTML instructions 202 in the source scenes 136 to generate a HTML code including one or more interactive HTML elements 162 and use the animation instructions 204 in the source scenes 136 to generate one or more animations 164 associated with the HTML code.

Execution proceeds to step 410, after generating video scenes 160 for all the source scenes 132, system 100 generates a scene collection 170 including all the generated video scenes 160. The video scenes 160 in the scene collection 170 are arranged in an ordering corresponding to the pre-determined ordering of the source scene IDs 134 specified in the video request 112.

At step 412, system 100 processes the video scenes 160 in the scene collection 170. For example, system 100 may map the video scenes 160 to a timeline. Specifically, system 100 may assign an animation ID to each of the animations 164 associated with each of the video scenes 160. In some embodiments, each animation 164 may include one or more frames. System 100 may further assign a frame ID to each of the frames in each of the animations 164. Then, system 100 maps the frame IDs to a pre-determined timeline. For example, system 100 may associated each frame ID with a time stamp in the pre-determined timeline. In some embodiments, the pre-determined timeline is determined based on the pre-determined ordering of source scene IDs in the video request 112. Next, system 100 parses the video scenes 160 in the form of a HTML page, analyzes the interactive HTML elements 162 in the HTML page, and creates a layout of the HTML page including some widgets implemented by the interactive HTML elements 302. System 100 may further render the animations 164 associated with a video scene 160. Then, system 100 creates a video by including the animations 164 in the rendered video scenes 302 (step 414).

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skill in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for creating an interactive video using a markup language, comprising:
a memory configured to store a plurality of source scenes associated with a plurality of source scene IDs, wherein each source scene comprises a set of instructions comprising:
  Hypertext Markup Language (HTML) instructions associated with web content; and
  animation instructions for animations associated with the web content;
a processor communicatively coupled to the memory and configured to:
  receive a video request, the video request comprising a subset of the source scene IDs arranged in a predetermined ordering;
  retrieve, from the memory, a subset of the source scenes associated with the subset of the source scene IDs;
  generate, for each of the subset of the source scenes, a video scene in the form of an HTML page based on the set of instructions associated with a source scene, wherein:
    generating a video scene comprises:
      generating HTML code based on the HTML instructions; and
      embedding code associated with the animation instructions into the generated HTML code; and
    the video scene comprises one or more interactive HTML elements and one or more animations associated with the one or more interactive HTML elements;
  generate a scene collection, the scene collection comprising the video scenes for each of the subset of the source scenes, wherein the video scenes in the scene collection are arranged based on the predetermined ordering; and
  send the scene collection to a playback engine; and
the playback engine communicatively coupled to the scene managing engine, the playback engine configured to:
  receive the scene collection from the processor;
  process the video scenes in the scene collection by mapping the video scene to a timeline, wherein processing the video scenes comprises generating a series of HTML pages based on the generated HTML code; and
  render the video scenes in the scene collection.

2. The system of claim 1, wherein the set of instructions comprise HTML instructions and animation instructions.

3. The system of claim 1, wherein the set of instructions have a format of JavaScript Object Notation (JSON).

4. The system of claim 1, wherein the set of instructions further comprise a plurality of transition effects instructions.

5. The system of claim 1, wherein one or more interactive HTML elements comprise at least one of the following:
a HTML string;
a Document Object Model (DOM) element; or
a jQuery object.

6. The system of claim 1, wherein each of the one or more interactive HTML elements, when clicked or pressed, presents one or more web content items or performs one or more predetermined drill-down tasks.

7. The system of claim 1, wherein the one or more animations comprises JavaScript instructions.

8. The system of claim 1, wherein processing the video scenes in the scene collection by mapping the video scene to a timeline comprises:
assigning an animation ID to each of the animations, wherein each of the animations comprises one or more frames;
for each of the animations, assigning a frame ID to each of the one or more frames of an animation; and
associating each frame ID with a time stamp in the timeline.

9. A non-transitory computer-readable medium comprising a logic for creating an interactive video using a markup language, the logic, when executed by one or more processors, instructing the one or more processors to:
receive a video request, the video request comprising a set of source scene IDs arranged in a predetermined ordering, wherein:
the set of source scene IDs are associated with a set of source scenes;
each source scene comprises a set of instructions comprising:
Hypertext Markup Language (HTML) instructions associated with web content; and
animation instructions for animations associated with the web content;
retrieve the set of source scenes associated with the set of the source scene IDs;
generate, for each of the set of source scenes, a video scene in the form of an HTML page based on the set of instructions associated with a source scene, wherein:
generating a video scene comprises:
generating HMTL code based on the HTML instructions; and
embedding code associated with the animation instructions into the generated HTML code; and
the video scene comprises one or more interactive HTML elements and one or more animations associated with the one or more interactive HTML elements;
generate a scene collection, the scene collection comprising the video scenes for each of the set of source scenes, wherein the video scenes in the scene collection are arranged based on the predetermined ordering; and
process the video scenes in the scene collection by mapping the video scene to a timeline, wherein processing the video scenes comprises generating a series of HTML pages based on the generated HTML code; and
render the video scenes in the scene collection.

10. The non-transitory computer-readable medium of claim 9, wherein the set of instructions comprise HTML instructions and animation instructions.

11. The non-transitory computer-readable medium of claim 9, wherein the set of instructions further comprise a plurality of transition effects instructions.

12. The non-transitory computer-readable medium of claim 9, wherein one or more interactive HTML elements comprise at least one of the following:
a HTML string;
a Document Object Model (DOM) element; or
a jQuery object.

13. The non-transitory computer-readable medium of claim 9, wherein each of the one or more interactive HTML elements, when clicked or pressed, presents one or more web content items or performs one or more predetermined drill-down tasks.

14. The non-transitory computer-readable medium of claim 9, wherein processing the video scenes in the scene collection by mapping the video scene to a timeline comprises:
assigning an animation ID to each of the animations, wherein each of the animations comprises one or more frames;
for each of the animations, assigning a frame ID to each of the one or more frames of an animation; and
associating each frame ID with a time stamp in the timeline.

15. A method for creating an interactive video using a markup language, comprising:
receiving a video request, the video request comprising a set of source scene IDs arranged in a predetermined ordering, wherein:
the set of source scene IDs are associated with a set of source scenes;
each source scene comprises a set of instructions comprising:
Hypertext Markup Language (HTML) instructions associated with web content; and
animation instructions for animations associated with the web content;
retrieving the set of source scenes associated with the set of the source scene IDs;
generating, for each of the set of the source scenes, a video scene in the form of an HTML page based on the set of instructions associated with a source scene, wherein:
generating a video scene comprises:
generating HTML code based on the HTML instructions; and
embedding code associated with the animation instructions into the generated HTML code; and
the video scene comprises one or more interactive HTML elements and one or more animations associated with the one or more interactive HTML elements;
generating a scene collection, the scene collection comprising the video scenes for each of the set of source scenes, wherein the video scenes in the scene collection are arranged based on the predetermined ordering; and
processing the video scenes in the scene collection by mapping the video scene to a timeline, wherein processing the video scenes comprises generating a series of HTML pages based on the generated HTML code; and
rendering the video scenes in the scene collection.

16. The method of claim 15, wherein the set of instructions comprise HTML instructions and animation instructions.

17. The method of claim 15, wherein the set of instructions further comprise a plurality of transition effects instructions.

18. The method of claim 15, wherein one or more interactive HTML elements comprise at least one of the following:
a HTML string;
a Document Object Model (DOM) element; or
a jQuery object.

19. The method of claim 15, wherein each of the one or more interactive HTML elements, when clicked or pressed, presents one or more web content items or performs one or more predetermined drill-down tasks.

20. The method of claim 15, wherein processing the video scenes in the scene collection by mapping the video scene to a timeline comprises:
assigning an animation ID to each of the animations, wherein each of the animations comprises one or more frames;
for each of the animations, assigning a frame ID to each of the one or more frames of an animation; and
associating each frame ID with a time stamp in the timeline.

* * * * *